United States Patent
Li et al.

(10) Patent No.: US 12,312,500 B1
(45) Date of Patent: May 27, 2025

(54) POLISHING PASTE FOR SUPERFINISHING OF BEARING STEEL, AND PREPARATION METHOD AND USE THEREOF

(71) Applicant: Taiyuan University of Technology, Shanxi (CN)

(72) Inventors: Xiuhong Li, Taiyuan (CN); Xingfu Wang, Taiyuan (CN); Xunzheng Zhai, Taiyuan (CN); Zhiqiang Liang, Taiyuan (CN); Wenhui Li, Taiyuan (CN); Shengqiang Yang, Taiyuan (CN); Zhenhua Liang, Taiyuan (CN); Jiaming Wang, Taiyuan (CN); Xuejie Wen, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 0 days.

(21) Appl. No.: 19/001,993

(22) Filed: Dec. 26, 2024

(30) Foreign Application Priority Data

Jun. 7, 2024 (CN) .......................... 202410733451.X

(51) Int. Cl.
*C09G 1/18* (2006.01)
(52) U.S. Cl.
CPC ..................................... *C09G 1/18* (2013.01)
(58) Field of Classification Search
CPC ....................................................... C09G 1/18
See application file for complete search history.

(56) References Cited

U.S. PATENT DOCUMENTS

2006/0088482 A1* 4/2006 Wulknitz ................ A61K 8/43
424/49

FOREIGN PATENT DOCUMENTS

| CN | 115595069 | * | 1/2023 | ............... C09G 1/02 |
| GB | 1062457 | * | 3/1967 | ............... C09G 1/10 |
| SU | 99448 | * | 11/1953 | ............... C09G 1/02 |

OTHER PUBLICATIONS

Hu: "Surface treatment technology manual revised edition", Beijing University of Technology Press, Jul. 2009.

* cited by examiner

*Primary Examiner* — Pegah Parvini
(74) *Attorney, Agent, or Firm* — WCF IP

(57) ABSTRACT

Provided are a polishing paste for superfinishing a bearing steel, and a preparation method and use thereof. The polishing paste includes the following components: in parts by mass, 8 parts to 10 parts of stearic acid, 10 parts to 15 parts of a white oil, 15 parts to 20 parts of a liquid paraffin, 3 parts to 5 parts of oleic acid, 3 parts to 5 parts of triethanolamine, and 50 parts to 60 parts of polishing abrasives. The disclosure provides a polishing paste for superfinishing of the bearing steel.

12 Claims, No Drawings

POLISHING PASTE FOR SUPERFINISHING OF BEARING STEEL, AND PREPARATION METHOD AND USE THEREOF

CROSS REFERENCE TO RELATED APPLICATION

This patent application claims the benefit and priority of Chinese Patent Application No. 202410733451.X filed with the China National Intellectual Property Administration on Jun. 7, 2024, the disclosure of which is incorporated by reference herein in its entirety as part of the present application.

TECHNICAL FIELD

The present disclosure relates to the technical field of surface finishing of mechanical parts, in particular to a polishing paste for superfinishing of a bearing steel, and a preparation method and use thereof.

BACKGROUND

Bearing steel, as a main raw material of bearing rings and rolling elements, is applied in various fields such as aerospace, high-end machine tools, wind power, high-speed rail, and high-end automobiles. Nano-scale ultra-precision machining could significantly enhance the fatigue performance of bearings during high-temperature and high-speed operation, thereby extending their service life. At present, in enterprises, surface finishing of bearings is typically achieved through grinding and oilstone superfinishing, which leave machining marks, fail to effectively remove sharp edges and burrs, and result in poor surface uniformity, severely affecting service performance.

Mass finishing process can comprehensively enhance the surface integrity performance of various complex-curved parts, such as gears, blisks, blades, bearings, and casings. At present, wet mass finishing is widely used to improve the surface quality of workpieces, both domestically and internationally. The wet mass finishing is suitable for parts with an initial surface roughness Ra value of 1.6 μm to 0.4 μm. After mass finishing, the surface roughness Ra value could reach about 0.2 μm. It is extremely difficult and time-consuming to realize nano-scale superfinishing. Further, a liquid media with multiple functions, such as cleaning, rust prevention, corrosion resistance and lubrication is usually added, which requires further treatment of wastewater and leads to high costs.

In the existing processing technology, organic media such as walnut shells, cotton seeds, sawdust, olive shells, and bamboo blocks are mixed with a finishing oil to realize surface finishing of parts, such as the reference (Hu Chuanxin. Surface treatment technology manual revised edition [M]. Beijing: Beijing University of Technology Press, 2009) pointed out that: in order to reduce the surface roughness of the parts, 60% to 80% of the cotton seed, red iron oxide (the main component is $Fe_2O_3$), 15% to 18% of the sawdust (or chaff) and 1% to 2% of oleic acid can be used for finishing process. For cast steel parts, it often takes 30 h to 40 h to achieve the surface finishing, and the machining efficiency is extremely low.

Based on this, the present disclosure plans to prepare a polishing paste for superfinishing of a bearing steel. The polishing paste in combination with the organic media such as the walnut shells, corncob, the olive shells is applied to the mass finishing process, to achieve uniform surface consistency and high-efficiency superfinishing of bearings.

SUMMARY

Objects of the present disclosure are to provide a polishing paste for superfinishing of a bearing steel, and a preparation method and use thereof, to solve the problems existing in the existing processing technology. By combining the polishing paste of the disclosure with an organic medium and using it in mass finishing process, surface roughness Ra values of bearing rollers could be rapidly reduced, and the surface finishing efficiency of parts could be improved.

To achieve the above objects, the present disclosure provides the following technical solutions.

The present disclosure provides a polishing paste for superfinishing of a bearing steel, including the following components: in parts by mass, 8 parts to 10 parts of stearic acid, 10 parts to 15 parts of a white oil, 15 parts to 20 parts of a liquid paraffin, 3 parts to 5 parts of oleic acid, 3 parts to 5 parts of triethanolamine, and 50 parts to 60 parts of polishing abrasives.

In some embodiments, the white oil is selected from the group consisting of 5 # white oil, 7 # white oil, and 10 # white oil.

In some embodiments, the polishing paste includes the following components: in parts by mass, 10 parts of the stearic acid, 10 parts of the 7 # white oil, 20 parts of the liquid paraffin, 5 parts of the oleic acid, 5 parts of the triethanolamine, and 60 parts of the polishing abrasives.

In some embodiments, the polishing abrasives have an average particle size of 1 μm to 5 μm.

In some embodiments, the polishing abrasives are selected from the group consisting of diamond abrasives, aluminum oxide abrasives, or chromium oxide abrasives.

The present disclosure further provides a method for preparing the polishing paste as described above, including the following steps:

heating the stearic acid until the stearic acid is completely melted into a transparent liquid I, then adding the oleic acid and the liquid paraffin in sequence while stirring, and stirring to be uniform to obtain a solution A;

mixing the white oil and the triethanolamine to be uniform to obtain a solution B; and adding the solution B to the solution A, fully stirring and mixing to be uniform at a temperature of 85° C. to 90° C. to obtain a transparent liquid II, then adding the polishing abrasives while stirring to form an emulsion, and finally cooling to form the polishing paste.

The present disclosure further provides use of the polishing paste as described above in preparing dry media for superfinishing the bearing steel.

The present disclosure further provides a method for preparing dry media for superfinishing the bearing steel, including: uniformly mixing the polishing paste as described above with renewable granular media to obtain the dry media.

In some embodiments, the renewable granular media are selected from the group consisting of walnut shells, corncobs, and olive shells; and a mass ratio of the polishing paste to the renewable granular media is 1:20.

The present disclosure further provides dry media for superfinishing the bearing steel prepared by the method as described above.

The present disclosure further provides use of the dry media as described above in the superfinishing of the bearing steel.

Some embodiments of the present disclosure have the following technical effects.

The present disclosure provides a polishing paste for superfinishing a bearing steel. By combining the polishing paste of the disclosure with organic media and using them in mass finishing process, surface roughness Ra values of bearing rollers could be rapidly reduced, and the mass finishing process is green and environment-friendly, thus expanding an application range of the mass finishing process.

The polishing abrasives used in the polishing paste of the present disclosure could realize micro grinding and realize surface finishing of a workpiece. A white oil is used as a base oil to realize mixing of all components and ensure the polishing paste as an oily medium. A liquid paraffin acts as a lubricant, providing lubrication. Stearic acid as a brightener, oleic acid as an emulsifier, and triethanolamine as an active agent, impart a surface of the workpiece with the decontamination ability. Further, the triethanolamine and the oleic acid generate triethanolamine oleate, and the triethanolamine and the stearic acid generate amine stearate, all of which could form a physical adsorption film on the surface of the workpiece, thereby promoting lubrication.

DETAILED DESCRIPTION OF THE EMBODIMENTS

Some exemplary embodiments of the present disclosure are now described in detail. The detailed description should not be considered as a limitation to the present disclosure, but should be understood as a more detailed description of certain aspects, features, and embodiments of the present disclosure.

It should be understood that terms described in the present disclosure are merely used to describe specific embodiments and are not intended to limit the present disclosure. In addition, for a numerical range in the present disclosure, it should be understood that each intermediate value between an upper limit and a lower limit of the range is also specifically disclosed. Each smaller range between any stated value or intermediate value in a stated range and any other stated value or intermediate value in the stated range is also included in the present disclosure. The upper and lower limits of these smaller ranges may independently be included or excluded from the range.

Unless otherwise specified, all technical and scientific terms used herein have the same meaning as commonly understood by those of ordinary skill in the art described in the present disclosure. Although the present disclosure describes merely preferred methods and materials, any methods and materials similar or equivalent to those described herein may also be used in the implement or testing of the present disclosure. All documents mentioned in this specification are incorporated by reference to disclose and describe methods and/or materials related to the documents. In case of conflicting with any incorporated documents, the content of this specification should prevail.

It is obvious to those skilled in the art that several improvements and variations could be made to the specific embodiments of the present specification without departing from the scope or spirit of the present disclosure. Other embodiments derived from the specification of the present disclosure are obvious to those skilled in the art. The specification and examples of the present disclosure are merely exemplary.

As used herein, "including", "comprising", "having", "containing", and the like are all open-ended terms, which means including but not limited to.

In the following examples, stearic acid ($CH_3(CH_2)_{16}COOH$) was purchased from Tianjin Chemical Reagent Co., Ltd, China; 5 # white oil, 7 # white oil, and 10 # white oil were purchased from Yiqun Chemical Store; a liquid paraffin was purchased from Sinopharm Chemical Reagent Co., Ltd, China with a serial number 30139860; oleic acid was purchased from Sinopharm Chemical Reagent Co., Ltd, China with a serial number 30138518; triethanolamine was purchased from Sinopharm Chemical Reagent Co., Ltd, China with a serial number 10023118.

Example 1

Formula of a polishing paste: 80 g of stearic acid, 150 g of 7 # white oil, 150 g of a liquid paraffin, 30 g of oleic acid, 30 g of triethanolamine, and 500 g of polishing abrasives.
Preparation of the Polishing Paste:

Each component was weighed according to the above formula, and then the following operations were performed.

(1) A beaker filled with stearic acid was put in a water bath, heated to a temperature of 85° C., and then kept at 85° C. After the stearic acid was completely melted into a transparent liquid I, the oleic acid and the liquid paraffin were added into the transparent liquid I in sequence under stirring, followed by stirring for 2 min, to obtain a solution A. The solution A was kept at 85° C. for later use.

The 7 # white oil and the triethanolamine were mixed, and a resulting mixture was heated to a temperature of 85° C., stirred for a certain time, and kept at 85° C. for later use to obtain a solution B.

(2) The solution B is slowly added to the solution A to obtain a mixed solution. The mixed solution was fully stirred and mixed to be uniform at a temperature of 85° C., and kept at 85° C. for 2 min.

(3) When the mixed solution in step (2) became a transparent liquid II, the polishing abrasives were added into the transparent liquid II under stirring in a water bath at a constant temperature of 85° C. to form an emulsion. The emulsion was kept at 85° C. for 5 min.

(4) The emulsion was cooled at room temperature and stirred for 2 min every other 2 min to finally form a semi-solid medium, namely the polishing paste.

The polishing abrasives used in this example were aluminum oxide abrasives with an average particle size of 2.1 μm.
Preparation and Use of Dry Media:

550 g of 12-mesh walnut shells and 27.5 g of the polishing paste were pre-packed in LL05 vertical centrifugal drum, and mixed evenly for 5 min at a rotation speed of 300 r/min, thereby becoming dry media.

The above-mentioned dry media were packed in a centrifugal drum, and a GCr15 bearing roller with Φ 12×14 was then put thereto. Finishing was conducted for 60 min with a rotating speed being set as 300 r/min. In a centrifugal media flow field, the dry media had a chemical-mechanical coupling effect on a surface of the GCr15 bearing roller, achieving superfinishing. The finishing effect is shown in Table 1.

TABLE 1

Use effect of the polishing paste in Example 1

| Different surfaces of roller | Surface roughness Ra/nm before finishing | Surface roughness Ra/nm after finishing |
|---|---|---|
| End surface | 137 | 44 |
| Outer diameter surface | 93.7 | 31 |

Example 2

Formula of a polishing paste: 100 g of stearic acid, 100 g of 7 # white oil, 200 g of a liquid paraffin, 50 g of oleic acid, 50 g of triethanolamine, and 600 g of polishing abrasives.
Preparation of the Polishing Paste:

Each component was weighed according to the above formula, and then the following operations were performed.

(1) A beaker filled with the stearic acid was put in a water bath, heated to a temperature of 88° C., and then kept at 88° C. After the stearic acid was completely melted into a transparent liquid I, the oleic acid and the liquid paraffin were added into the transparent liquid I in sequence under stirring, followed by stirring for 5 min, to obtain a solution A. The solution A was kept at 88° C. for later use.

The 7 # white oil and the triethanolamine were mixed, and a resulting mixture was heated to a temperature of 88° C., stirred for a certain time, and kept at 88° C. for later use to obtain a solution B.

(2) The solution B is slowly added to the solution A to obtain a mixed solution. The mixed solution was fully stirred and mixed to be uniform at a temperature of 88° C., and kept at 88° C. for 2 min.

(3) When the mixed solution in step (2) became a transparent liquid II, the polishing abrasives were added into the transparent liquid II under stirring in a water bath at a constant temperature of 88° C. to form an emulsion. The emulsion was kept at 88° C. for 5 min.

(4) The emulsion was cooled at room temperature and stirred for 2 min every other 2 min to finally form a semi-solid medium, namely the polishing paste.

The polishing abrasives used in this example were diamond abrasives with an average particle size of 5 μm.
Preparation and Use of Dry Media:

550 g of 12-mesh walnut shells and 27.5 g of the polishing paste were pre-packed in LL05 vertical centrifugal drum, and mixed evenly for 5 min at a rotation speed of 300 r/min, thereby becoming dry media.

The above-mentioned dry media were packed in a centrifugal drum, and a GCr15 bearing roller with Φ 12×14 was then put thereto. Finishing was conducted for 60 min with a rotating speed being set as 300 r/min. In a centrifugal media flow field, the dry media had a chemical-mechanical coupling effect on a surface of the GCr15 bearing roller, achieving superfinishing. The finishing effect is shown in Table 2.

TABLE 2

Use effect of the polishing paste in Example 2

| Different surfaces of roller | Surface roughness Ra/nm before finishing | Surface roughness Ra/nm after finishing |
|---|---|---|
| End surface | 153 | 24.8 |
| Outer diameter surface | 98.8 | 21.7 |

Example 3

Formula of a polishing paste: 90 g of stearic acid, 120 g of 7 # white oil, 160 g of a liquid paraffin, 40 g of oleic acid, 40 g of triethanolamine, and 550 g of polishing abrasives.
Preparation of the Polishing Paste:

Each component was weighed according to the above formula, and then the following operations were performed.

(1) A beaker filled with the stearic acid was put in a water bath, heated to a temperature of 90° C., and then kept at 90° C. After the stearic acid was completely melted into a transparent liquid I, the oleic acid and the liquid paraffin were added into the transparent liquid I in sequence under stirring, followed by stirring for 4 min, to obtain a solution A. The solution A was kept at 90° C. for later use.

The 7 # white oil and the triethanolamine were mixed, and a resulting mixture was heated to a temperature of 90° C., stirred for a certain time, and kept at 90° C. for later use to obtain a solution B.

(2) The solution B is slowly added to the solution A to obtain a mixed solution. The mixed solution was fully stirred and mixed to be uniform at a temperature of 90° C., and kept at 90° C. for 2 min.

(3) When the mixed solution in step (2) became a transparent liquid II, the polishing abrasives were added into the transparent liquid II under stirring in a water bath at a constant temperature of 90° C. to form an emulsion. The emulsion was kept at 90° C. for 5 min.

(4) The emulsion was cooled at room temperature and stirred for 2 min every other 2 min to finally form a semi-solid medium, namely the polishing paste.

The polishing abrasives used in this example were diamond abrasives with an average particle size of 1 μm.
Preparation and Use of Dry Media:

550 g of 12-mesh walnut shells and 27.5 g of the polishing paste were pre-packed in LL05 vertical centrifugal drum, and mixed evenly for 5 min at a rotation speed of 300 r/min, thereby becoming dry media.

The above-mentioned dry media were packed in a centrifugal drum, and a GCr15 bearing roller with Φ 12×14 was then put thereto. Finishing was conducted for 60 min with a rotating speed being set as 300 r/min. In a centrifugal media flow field, the dry media had a chemical-mechanical coupling effect on a surface of the GCr15 bearing roller, achieving superfinishing. The finishing effect is shown in Table 3.

TABLE 3

Use effect of the polishing paste in Example 3

| Different surfaces of roller | Surface roughness Ra/nm before finishing | Surface roughness Ra/nm after finishing |
|---|---|---|
| End surface | 145 | 45 |
| Outer diameter surface | 96.1 | 14.5 |

Example 4

This example was performed according to Example 1 except that in this example was that chromium oxide abrasives (with an average particle size of 2.8 μm) was used instead of aluminum oxide abrasives (with an average particle size of 2.1 μm).

The polishing effect of the dry media prepared in this example is shown in Table 4.

TABLE 4

Use effect of the polishing paste in Example 4

| Different surfaces of roller | Surface roughness Ra/nm before finishing | Surface roughness Ra/nm after finishing |
|---|---|---|
| End surface | 155 | 45 |
| Outer diameter surface | 87 | 20 |

Example 5

This example was performed according to Example 1 except that in this example, corncobs were used instead of the walnut shells.

The polishing effect of the dry media prepared from the corncobs is shown in Table 5.

TABLE 5

Use effect of the polishing paste in Example 5

| Different surfaces of roller | Surface roughness Ra/nm before finishing | Surface roughness Ra/nm after finishing |
|---|---|---|
| End surface | 132.3 | 78.5 |
| Outer diameter surface | 90.8 | 59.7 |

Example 6

This example was performed according to Example 1 except that in this example, olive shells were used instead of the walnut shells.

The polishing effect of the dry media prepared from the olive shells is shown in Table 6.

TABLE 6

Use effect of the polishing paste in Example 6

| Different surfaces of roller | Surface roughness Ra/nm before finishing | Surface roughness Ra/nm after finishing |
|---|---|---|
| End surface | 135 | 79.5 |
| Outer diameter surface | 90.1 | 48 |

Example 7

This example was performed according to Example 1 except that in this example, 5 # white oil was used instead of 7 # white oil.

Example 8

This example was performed according to Example 1 except that in this example, 10 # white oil was used instead of 7 # white oil.

The use effects of the polishing pastes prepared in Examples 7 and 8 were tested. The results are shown in Table 7.

TABLE 7

Use effect of the polishing paste in Examples 7 and 8

| Examples | Roughness Ra/nm of roller end surface | | Roughness Ra/nm of roller outer diameter surface | |
|---|---|---|---|---|
| | Before finishing | After finishing | Before finishing | After finishing |
| Example 7 | 134 | 39 | 90.8 | 32 |
| Example 8 | 146 | 43.2 | 91.9 | 28.7 |

Comparative Example 1

This example was performed according to Example 1 except that in this comparative example, formula of the polishing paste did not contain stearic acid, and thus oleic acid and a liquid paraffin were directly mixed and stirred to obtain a solution A.

The polishing paste prepared in this Comparative Example was in a liquid state.

Comparative Example 2

This example was performed according to Example 1 except that in this comparative example, formula of a polishing paste did not contain oleic acid: after stearic acid was completely melted into a transparent liquid I, liquid paraffin was added into the transparent liquid I under stirring, followed by stirring, to obtain a solution A.

The polishing paste prepared in this Comparative Example was in semi-solid state.

Comparative Example 3

This example was performed according to Example 1 except that in this comparative example, formula of a polishing paste did not contain triethanolamine; 7 # white oil was directly heated to 85° C., which was a solution B.

The polishing paste prepared in this Comparative Example was in solid state.

Using the polishing pastes prepared in Comparative Examples 1-3, dry media were prepared by the same method as described in Example 1. Using the dry media, a GCr15 bearing roller with Φ 12×14 was finished respectively. The processing effect is shown in Table 7.

TABLE 7

Use effect of the polishing pastes in Comparative Examples 1-3

| Comparative Examples | Roughness Ra/nm of roller end surface | | Roughness Ra/nm of roller outer diameter surface | |
|---|---|---|---|---|
| | Before finishing | After finishing | Before finishing | After finishing |
| Comparative Example 1 | 148.5 | 60 | 96.0 | 33.8 |
| Comparative Example 2 | 137 | 67 | 90.3 | 43.4 |
| Comparative Example 3 | 133.2 | 50 | 91 | 39.3 |

The above examples are merely intended to describe the preferred embodiments of the present disclosure, but not to limit the scope of the present disclosure. Several variations and improvements made by a person of ordinary skill in the art based on the technical solutions of the present disclosure without departing from the design spirit of the present disclosure should fall within the scope of the appended claims of the present disclosure.

What is claimed is:

1. A polishing paste for superfinishing a bearing steel, comprising the following components: in parts by mass, 8 parts to 10 parts of stearic acid, 10 parts to 15 parts of a white oil, 15 parts to 20 parts of a liquid paraffin, 3 parts to 5 parts of oleic acid, 3 parts to 5 parts of triethanolamine, and 50 parts to 60 parts of polishing abrasives.

2. The polishing paste of claim 1, wherein the white oil is selected from the group consisting of 5 # white oil, 7 # white oil, and 10 # white oil.

3. The polishing paste of claim 1, wherein the polishing paste comprises the following components: in parts by mass, 10 parts of the stearic acid, 10 parts of 7 # white oil, 20 parts of the liquid paraffin, 5 parts of the oleic acid, 5 parts of the triethanolamine, and 60 parts of the polishing abrasives.

4. The polishing paste of claim 1, wherein the polishing abrasives are selected from the group consisting of diamond abrasives, aluminum oxide abrasives, and chromium oxide abrasives.

5. A method for preparing the polishing paste of claim 1, comprising the following steps:
heating the stearic acid until the stearic acid is completely melted into a transparent liquid I, then adding the oleic acid and the liquid paraffin in sequence while stirring, and stirring to be uniform to obtain a solution A;
mixing the white oil and the triethanolamine to be uniform to obtain a solution B; and
adding the solution B to the solution A, fully stirring and mixing to be uniform at a temperature of 85° C. to 90° C. to obtain a transparent liquid II, then adding the polishing abrasives while stirring to form an emulsion, and finally cooling to form the polishing paste.

6. A method for preparing dry media for superfinishing a bearing steel, comprising: mixing the polishing paste of claim 1 with renewable granular media to obtain the dry media.

7. The method of claim 6, wherein the renewable granular media are selected from the group consisting of walnut shells, corncobs, and an olive shells; and
a mass ratio of the polishing paste to the renewable granular media is 1:20.

8. Dry media for the superfinishing of the bearing steel prepared by the method of claim 6.

9. The method of claim 6, wherein the white oil is selected from the group consisting of 5 # white oil, 7 # white oil, and 10 # white oil.

10. The method of claim 6, wherein the polishing paste comprises the following components: in parts by mass, 10 parts of the stearic acid, 10 parts of 7 # white oil, 20 parts of the liquid paraffin, 5 parts of the oleic acid, 5 parts of the triethanolamine, and 60 parts of the polishing abrasives.

11. The method of claim 6, wherein the polishing abrasives are selected from the group consisting of diamond abrasives, aluminum oxide abrasives, and chromium oxide abrasives.

12. The dry media for the superfinishing of the bearing steel of claim 8, wherein the renewable granular media are selected from the group consisting of walnut shells, corncobs, and an olive shells; and
a mass ratio of the polishing paste to the renewable granular media is 1:20.

* * * * *